United States Patent
Kleppa

(10) Patent No.: US 11,708,749 B2
(45) Date of Patent: Jul. 25, 2023

(54) DOWNHOLE DEVICE WITH SIGNAL TRANSMITTER

(71) Applicant: PETROLEUM TECHNOLOGY COMPANY AS, Stavanger (NO)

(72) Inventor: Erling Kleppa, Jørpeland (NO)

(73) Assignee: Petroleum Technology Company AS, Stavanger (NO)

( * ) Notice: Subject to any disclaimer, the term of this patent is extended or adjusted under 35 U.S.C. 154(b) by 0 days.

(21) Appl. No.: 16/754,735

(22) PCT Filed: Oct. 9, 2018

(86) PCT No.: PCT/NO2018/050241
§ 371 (c)(1),
(2) Date: Apr. 8, 2020

(87) PCT Pub. No.: WO2019/074374
PCT Pub. Date: Apr. 18, 2019

(65) Prior Publication Data
US 2020/0308941 A1 Oct. 1, 2020

(30) Foreign Application Priority Data
Oct. 10, 2017 (NO) .................................. 20171613

(51) Int. Cl.
*E21B 43/12* (2006.01)
*E21B 47/135* (2012.01)
(Continued)

(52) U.S. Cl.
CPC ............ *E21B 43/123* (2013.01); *E21B 34/06* (2013.01); *E21B 47/135* (2020.05); *E21B 47/14* (2013.01);
(Continued)

(58) Field of Classification Search
CPC ...... E21B 43/123; E21B 43/122; E21B 43/12; E21B 47/135; E21B 47/14; E21B 47/06;
(Continued)

(56) References Cited

U.S. PATENT DOCUMENTS

| | | | |
|---|---|---|---|
| 2002/0029883 A1* | 3/2002 | Vinegar | E21B 34/16 166/250.15 |
| 2006/0157239 A1* | 7/2006 | Ramos | E21B 47/10 166/254.2 |

(Continued)

FOREIGN PATENT DOCUMENTS

| | | |
|---|---|---|
| WO | 2017027978 A1 | 2/2017 |
| WO | 2017203290 A1 | 11/2017 |

OTHER PUBLICATIONS

PCT International Search Report; PCT/N02018/050241; dated Jan. 22, 2016.
Norwegian Search Report, NO 20171613, dated May 4, 2018.

*Primary Examiner* — Blake Michener
*Assistant Examiner* — Yanick A Akaragwe
(74) *Attorney, Agent, or Firm* — K&L Gates LLP

(57) ABSTRACT

A downhole device for installation in a petroleum well, comprising a sensor, a controller and a power source. The device further comprises an acoustic speaker configured to output a sound signal from the downhole device to a fiber optic cable in the well.

13 Claims, 3 Drawing Sheets

(51) Int. Cl.
*E21B 34/06* (2006.01)
*E21B 47/14* (2006.01)
*E21B 47/06* (2012.01)
*G01H 9/00* (2006.01)
*G01V 11/00* (2006.01)

(52) U.S. Cl.
CPC ............ *G01H 9/004* (2013.01); *E21B 47/06* (2013.01); *G01V 11/002* (2013.01)

(58) Field of Classification Search
CPC ......... E21B 47/12; E21B 34/06; G01H 9/004; G01V 11/002; G01V 2001/526
See application file for complete search history.

(56) References Cited

U.S. PATENT DOCUMENTS

| | | |
|---|---|---|
| 2010/0187714 A1 | 7/2010 | Kobiki et al. |
| 2013/0092371 A1 | 4/2013 | Hartog et al. |
| 2014/0126331 A1 | 5/2014 | Skinner |
| 2016/0053593 A1 | 2/2016 | Romer et al. |
| 2017/0167249 A1 | 6/2017 | Lee et al. |
| 2017/0260846 A1* | 9/2017 | Jin ....................... G01B 11/161 |
| 2018/0058202 A1 | 3/2018 | Disko et al. |
| 2018/0058209 A1 | 3/2018 | Song et al. |

* cited by examiner

DOWNHOLE DEVICE WITH SIGNAL TRANSMITTER

BACKGROUND

Field of the Disclosure

The disclosure relates to a downhole device and, more particularly, to a downhole device for installation in a petroleum well.

DESCRIPTION OF THE RELATED ART

To improve the production from petroleum wells, gas lift operations are commonly applied. In order to improve the reliability and efficiency of such gas lift operations, increase the utilization of a well and allow deeper lift gas injection, several methods are known in the art. However, known methods for increasing well utilization commonly add risk, cost and complexity to a project.

Obtaining reliable feedback from a downhole device in a production tubing is also a known problem, and often it requires comprehensive modifications of the well and the production tubing.

There is therefore a need in the art for devices and methods to enable improved communication to a downhole device and/or from a downholde device to a topside controller, without adding significant complexity and cost to a project.

SUMMARY

In accordance with an embodiment, there is provided a device for installation in a well. The device comprises a sensor, a controller and a power source.

The device further comprises a signal transmitter configured to output a signal from the downhole device to a line in the well.

According to another embodiment, the device is configured to output a signal in response to an input to the sensor.

According to another embodiment, the sensor is a pressure sensor.

According to another embodiment, the input is a pressure sequence.

According to another embodiment, the signal transmitter is an acoustic speaker and the signal is sound.

According to another embodiment, the line is a fiber optic cable.

According to another embodiment, the signal transmitter is an electromagnetic spool.

According to another embodiment, the line is an electro conductive line.

According to another embodiment, the device is a gas lift valve, a chemical injection valve, a sliding sleeve, an inflow device or a circulating device.

According to another embodiment, the power source is a battery or an electric generator.

According to another embodiment, the device is configured for installation in a production tubing.

According to another embodiment, there is provided a method of communicating a signal between a downhole device and a topside controller.

The method comprises the step of providing a downhole device, and operating the signal transmitter to transmit an output signal to the topside controller via a line arranged in the well.

According to another embodiment, the method further comprises transmitting an input signal from the topside controller to the downhole device.

BRIEF DESCRIPTION OF THE DRAWINGS

These and other characteristics will become clear from the following description of embodiments, given as non-restrictive examples, with reference to the attached schematic drawings.

DETAILED DESCRIPTION

Figure 1:
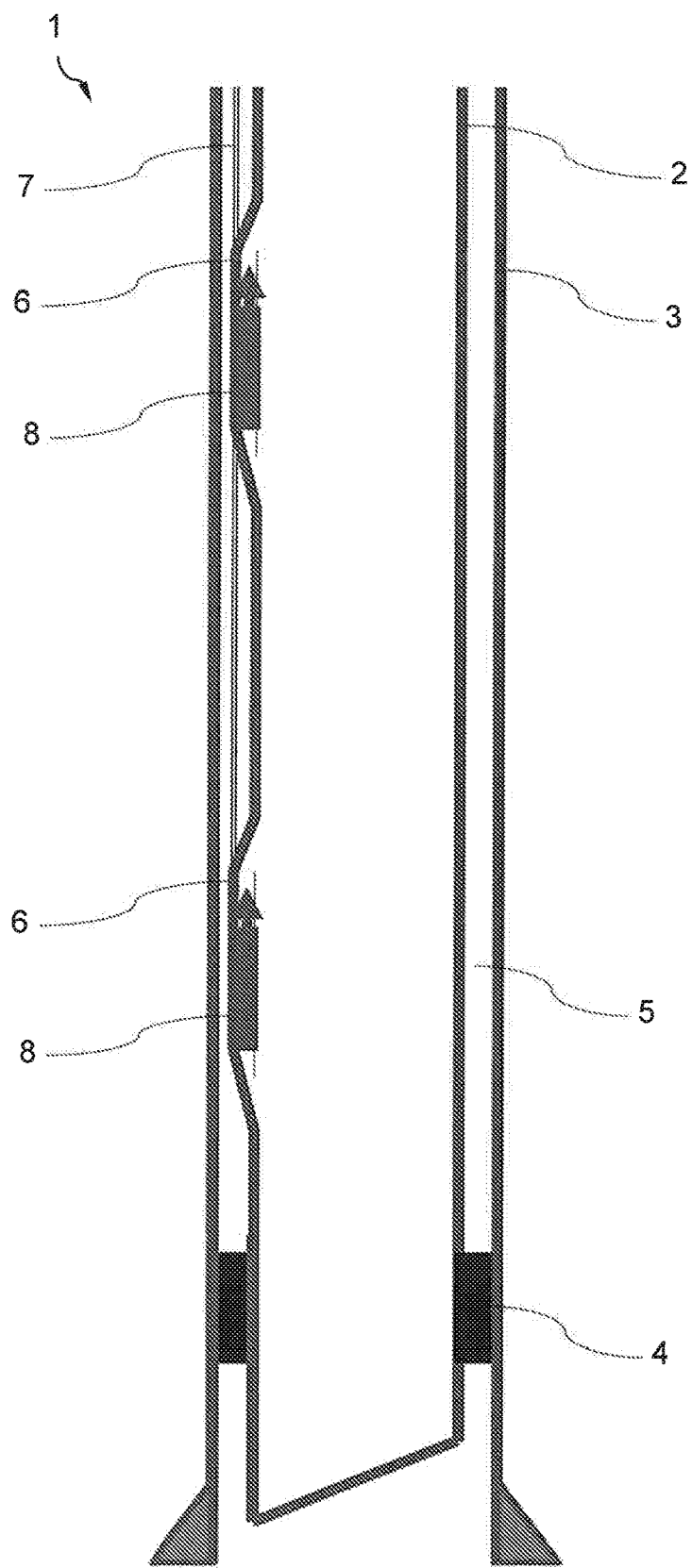
FIG. 1 is a schematic section view of a production tubing with side pocket mandrels, and gas lift valves with signal transmitters.

The following description may use terms such as "horizontal", "vertical", "lateral", "upper", "lower", "inner", "outer", "forward", "rear", etc. These terms generally refer to the views and orientations as shown in the drawings and that are associated with a normal use of the embodiments of the disclosure. The terms are used for the reader's convenience only and shall not be limiting.

FIG. 1 shows a petroleum well completion 1 with a production tubing 2 inside a casing 3, with a production packer 4 sealing off the annular space 5. The production tubing 2 comprises SPMs (Side Pocket Mandrels) 6, in the figure, two SPMs are illustrated, but as the skilled person will appreciate, there could be more or fewer SPMs. SPMs can house, for example, a dummy or a commonly known GLV (Gas Lift Valve). The well completion 1 comprises a DTS (Distributed Temperature Sensing) line 7, which is a fiber optic cable configured for temperature sensing. Such a DTS line can accurately measure temperature linearly at a large number of points along the line. In an embodiment, the same DTS line 7, or a separate DTS linbe, can be used for DAS (Distributed Acoustic Sensing) by arranging the software topside for this purpose. The DTS line 7 is thus effectively transformed into a large number of microphones arranged along the tubing 2.

The gas lift valve in FIG. 1 is a gas lift valve 8 with a signal transmitter 13 (described in further detail below). A standard GLV replacement operation is all which is required in order to change an existing dummy or GLV with a gas lift valve 8 with a signal transmitter 13. The gas lift valve 8 with signal transmitter 13 can, for example, communicate its status by means of an acoustic output signal. This is described more in detail with reference to FIG. 2b. The sound signal is picked up by the DTS line 7, and communicated to a controller topside (illustrated in FIG. 2b). Orders to the gas lift valve 8 can, for example, be transmitted by manipulating the pressure in the annulus 5, which per se is commonly known in the art. This manipulating is also described more in detail with reference to FIG. 3. A problem with gas lift valves commonly used today is that one does not know with confidence whether a valve is actually open or not, i.e. whether the valve received and executed an order, because the communication flow to the valves is in most cases one-way. According to this embodiment, the gas lift valve 8 can output a signal through the signal transmitter 13, which is picked up and read, to provide an indication to the operator of the operational status of the valve 8.

In order to install a fully functional system comprising gas lift valves 8 with signal transmitters 13, existing dummies or GLVs present in the SPMs can be pulled per standard procedures and replaced with one or more gas lift valves 8 having signal transmitters 13. An interpretation program can then be uploaded to a DAS system, or connected to a separate PC. In use, the annulus pressure can be manipulated to change position of injection, i.e. to open/close a valve 8, change which valve 8 is active, or in order to change the port size in a specific valve 8. As the gas lift valves 8 with signal transmitters 13 can communicate acoustic signals through the signal transmitter 13, the valve 8 can be configured to output a signal representative of its position and operational status. The interpretation program, typically arranged topside, can listen in the fiber cable (DTS line) to receive the signal and verify status of the valve 8.

The operator can thus receive a feedback signal from the valves 8 regarding their operational state and, as required, transmit a signal to one or more valves 8 to open, close, or otherwise change their operational state. Following such a command, a topside controller can receive a second feedback signal indicative of the progress and status of the valve 8. If there are several valves 8 positioned in a well 1, each valve 8 could have their own unique feedback signal, such that the controller can identify which valve the communication is sent from. The unique feedback signal could be a frequency, sequence, etc. identifying the valve 8.

Figures 2A, 2B:
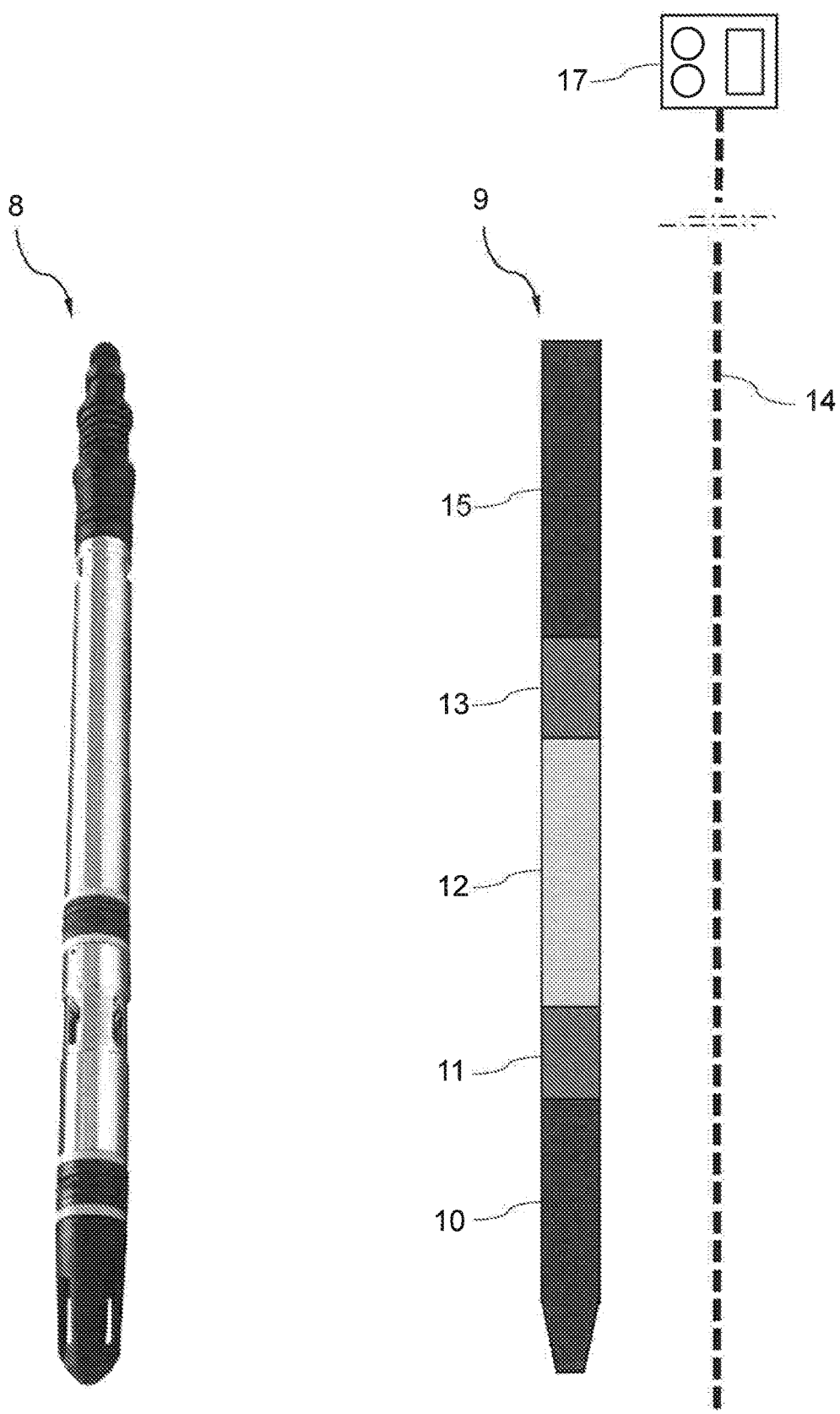
FIG. 2a is a perspective view of a gas lift valve with a signal transmitter.
FIG. 2b is a schematic section view of a downhole device with a signal transmitter, and a topside controller.

FIG. 2*a* shows an example of a gas lift valve 8 with a signal transmitter, and a more simplified illustration of a device 9 with a signal transmitter is shown in FIG. 2*b*.

In FIG. 2*b*, the downhole device 9 with signal transmitter comprises an action module 10. In the illustrated embodiment, the action module 10 is a barrier valve which is electronically controlled. The downhole device 9 with signal transmitter 13 need, however, not be a gas lift valve, and need not comprise a barrier valve as illustrated; the downhole device 9 could be any device for use in a well or a production tubing which advantageously can communicate an output signal, such as chemical injection valves, sliding sleeves, inflow devices, circulating devices and other devices that need change in operation mode. The device 9 with signal transmitter 13 can also be installed in other places than a SPM, as described with reference to FIG. 1, and could thus be configured for installation elsewhere in a production tubing 2, such as in a riser, a liner, a subsea line or other tubings and casings located in the well 1. The barrier valve in the shown embodiment is a valve which can physically open or close.

The downhole device 9 comprises a sensor 11, which can be an annulus pressure-sensor, adapted for sensing and receiving pressure changes in the annulus 5. Such pressure-sensors are per se known in the art. The sensor 11 could also be an acoustic sensor, a temperature sensor or an electromagnetic sensor, depending on the input it is designed to receive. The sensor 11 could be configured to receive input signals, e.g. pressure signals, from the annulus 5 side, from the tubing side (e.g. pressure signals transmitted within the tubing 2), or both.

A controller 12, e.g. a CPU (Computer Processing Unit), processes the input (e.g. changes in pressure) such that the downhole device 9 can act correspondingly. In response to the input, and resulting from the processing in the CPU, a signal transmitter 13 generates an output signal which is received by a line 14. If the line 14 is a DTS line, the signal transmitter 13 can be a speaker and the output signal can be an acoustic sound signal which is directly picked up by the line 14 and transmitted. If the line 14 is an electro conductive line, the signal transmitter 13 can be an electromagnetic spool or similar which outputs electro mechanical signals such as an electromagnetic pulse, which are received by the line 14. The signals are thus transmitted from the downhole device 9 via the line 14 to a topside controller 17. The ropside controller 17 may in one embodiment be a fiber optic based optoelectronic instrument capable of measuring acoustic interactions along the length of the line 14. The line 14 can also be a copper line or similar, onto which microphones are installed. The microphones can receive sound signals from the signal transmitter 13 and transmit them via the line 14 to a topside controller 17.

In order for the topside controller 17 to be able to distinguish different downhole devices 9 from each other, each downhole device 9 could have it's own identifiable signature in the signal it communicates to the topside controller 17. The signature may be a sound at a unique frequency or a sound signal transmitted in a unique sequence, such that the topside controller 17 is able to distinguish the different downhole devices 9, and precisely indicate the status of each individual downhole device 9 in a well.

The device 9 comprises a battery 15 which powers the downhole device 9. A battery used as a power source is commonly known in the art. Alternatively, the power source could be a power generator, such as a thermal power generator or a unit which generates electrical power from pressure variations, installed in the device 9. Alternatively, the device 9 could be powered through an electric line, or it could be powered through induction.

Figure 3:
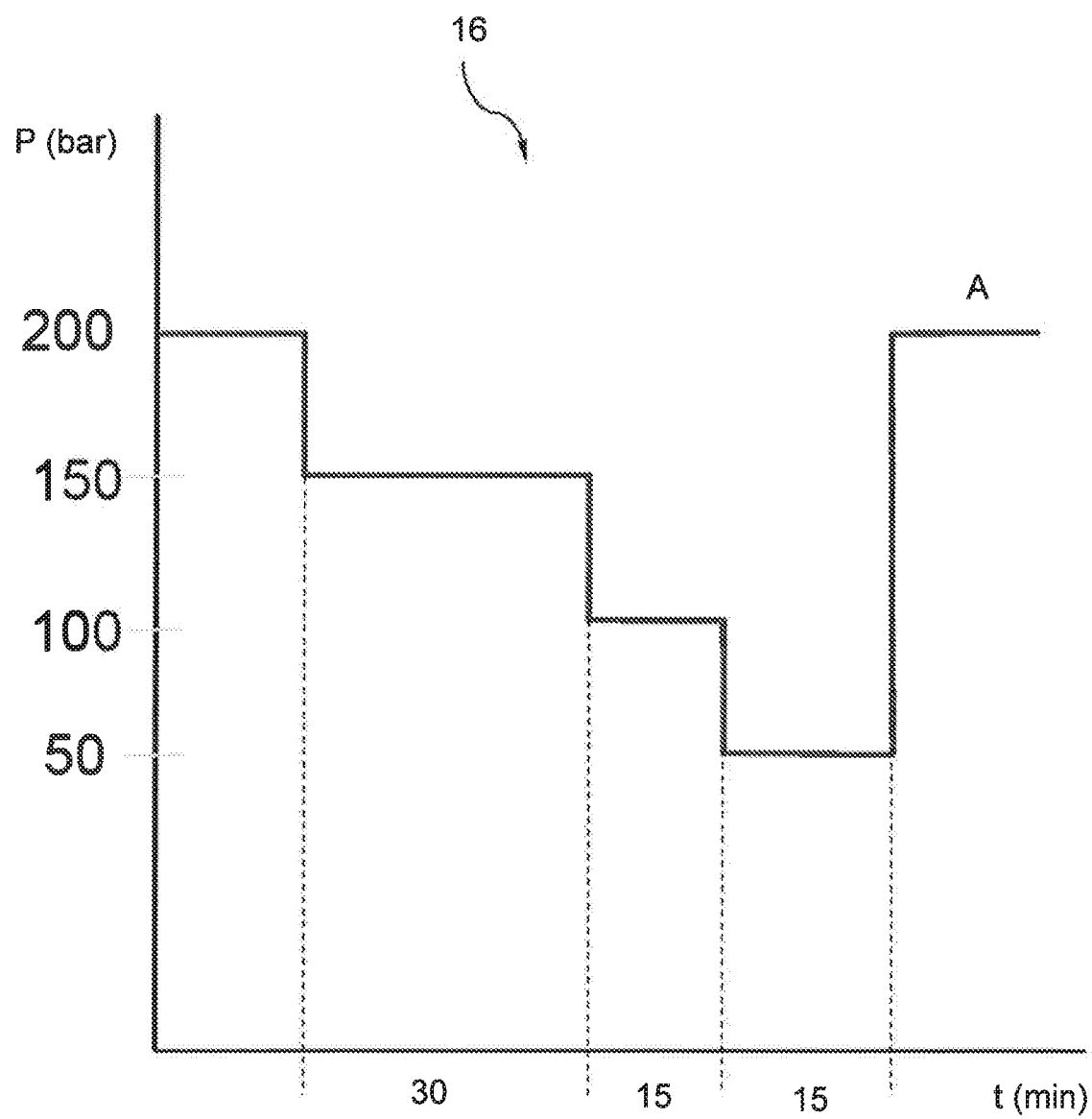
FIG. 3 is a graph showing one example of a pressure input sequence.

FIG. 3 illustrates an example of an annulus pressure input sequence 16 to be received by the pressure sensor 11. The goal can be to inject one station deeper, and in order to activate one or more valves or units for this purpose, the gas lift pressure in the annulus 4 can be reduced e.g. by 50 bar and maintained stable for e.g. 30 minutes. After receiving this signal (i.e. a partial pressure-sequence), the gas lift valves with signal transmitters can verify that they are in listening mode by communicating a pre-determined output signal from the signal transmitter 13, via the line 14 and to the surface controller. In order to close e.g. an upper valve, a further pressure-combination is performed, e.g. the pressure is decreased by 50 bar for 15 minutes, and then the pressure is decreased by yet 50 bar for 15 minutes. When the full pressure-sequence 17 is communicated, the relevant gas lift valve with signal transmitter can e.g. close, and confirm new status back to the controller by transmitting an output signal from the signal transmitter 13 via the line 4. The gas lift pressure is then increased back to e.g. 200 bar, indicated A in FIG. 3, to continue gas lift operations.

An alternative way of communicating to the downhole device can be by eco meter pulsing, e.g. an echo meter which fires with gas guns to create a pulse.

According to an embodiment described herein, there is thus provided a downhole device which can respond to a signal, for example pressure changes in the annulus pressure, and provide signals back to a controller via a line 14. Devices according to some embodiments can be installed in existing wells and make use of the already installed equipment such as fiber optic lines or electric cables, in order to be able to output signals back to a controller. With e.g. conventional pressure operated tools it is very difficult to know if they have received the control pressure and responds to the order or not. With devices according to embodiments described herein, the status of each device can be received through an already present line, such as a DTS line, which is used for communication of an output signal from the device 9.

The downhole device can advantageously be arranged such that it can be installed by means of standard procedures, and to require no specialized operations or tools.

While embodiments of the disclosure have been described with reference to the embodiment(s) mentioned above, it is to be understood that modifications and variations can be made without departing from the scope of the present disclosure, and such modifications and variations shall remain within the field and scope of the disclosure.

The invention claimed is:

1. A wellbore installation comprising:
    a plurality of downhole devices installed in a petroleum well, the plurality of downhole devices including a first downhole device and a second downhole device;
    a fiber optic cable in the petroleum well; and
    a topside controller,
    wherein each of the first and second downhole devices comprises:
        a sensor,
        a controller,
        a power source, and
        an acoustic speaker configured to output a sound signal to the fiber optic cable,
    wherein the fiber optic cable functions as both a distributed temperature sensing (DTS) line and a distributed audio sensing (DAS) line,
    wherein the topside controller is configured to receive the sound signal,
    wherein the sound signal from each of the first and second downhole devices includes an identifiable signature,
    wherein the top controller is configured to distinguish whether the sound signal is from the first downhole device or the second downhole device based on the identifiable signature, and
    wherein the identifiable signature comprises a sound signal that is transmitted in a unique sequence, wherein the unique sequence of the sound signal of the first downhole device is different from the unique sequence of the sound signal of the second downhole device, wherein the unique sequence of the sound signal of the first downhole device comprises the sound signal being transmitted and maintained for a first amount of time, and the unique sequence of the sound signal of the second downhole device comprises the sound signal being transmitted and maintained for a second amount of time that is different from the first amount of time,
    wherein the topside controller is configured to transmit a first pressure sequence to activate the first downhole device, wherein the first pressure sequence comprises an annulus pressure being reduced and maintained for a third amount of time;
    wherein the first downhole device is configured to:
        responsive to receiving the first pressure sequence, transitioning to a listening mode; and
        transmitting, by the acoustic speaker, a predetermined sound signal to the topside controller, wherein the predetermined sound signal indicates that the first downhole device is in the listening mode.

2. The wellbore installation according to claim 1, wherein each of the first and second downhole devices is configured to output a signal in response to an input to the sensor.

3. The wellbore installation according to claim 2, wherein the input which the sensor is configured to receive is a pressure sequence.

4. The wellbore installation according to claim 1, wherein the sensor is a pressure sensor.

5. The wellbore installation according to claim 1, wherein at least one of the first and second downhole devices is at least one of a gas lift valve, a chemical injection valve, a sliding sleeve, an inflow device, and/or a circulating device.

6. The wellbore installation according to claim 1, wherein the power source is a battery or an electric generator.

7. The wellbore installation according to claim 1, wherein at least one of the first and second downhole devices is configured for installation in a production tubing.

8. A method of communicating a sound signal between a downhole device in a well and a topside controller, comprising the steps of:
    providing the wellbore installation according to claim 1; and
    operating the acoustic speaker of at least one of the first and second downhole devices to transmit the sound signal to the topside controller via the fiber optic cable arranged in the well.

9. The method according to claim 8, further comprising:
    transmitting an input signal from the topside controller to at least one of the first and second downhole devices.

10. The method according to claim 9, wherein the input signal is a pressure sequence.

11. The method according to claim 8, further comprising activating an action module in at least one of the first and second downhole devices.

12. The method according to claim 11, further comprising transmitting an input signal from the topside controller to at least one of the first and second downhole devices, wherein the step of activating the action module comprises activating the action module in response to the input signal.

13. The method according to claim 11, wherein the step of activating the action module comprises opening or closing a valve.

* * * * *